Apr. 3, 1923. H. HART-SPRATT 1,450,805
UNIVERSAL JOINT OR COUPLING
Filed July 18, 1922

Witnesses:
L. C. Badeau
H. D. Penney

Inventor:
Herbert Hart-Spratt,
By his Atty,

Patented Apr. 3, 1923.

1,450,805

UNITED STATES PATENT OFFICE.

HERBERT HART-SPRATT, OF LONDON, ENGLAND.

UNIVERSAL JOINT OR COUPLING.

Application filed July 18, 1922. Serial No. 575,788.

*To all whom it may concern:*

Be it known that I, HERBERT HART-SPRATT, a subject of the King of Great Britain, residing in London, England, have invented certain new and useful Improvements in Universal Joints or Couplings, of which the following is a specification.

This invention relates to an improved universal joint or coupling and it has for its object to provide a joint or coupling for the connection of shafts or other power transmitting elements in which rolling motion takes place between the driving parts, whereby friction, such as exists in universal joints as generally constructed, is reduced to a minimum.

A joint or coupling according to this invention further presents the advantage that it is silent in operation, is dust proof and requires a minimum amount of attention so far as lubrication is concerned.

A joint or coupling according to this invention comprises two members having means for drivingly connecting them and having their faces cupped to engage a spherical or annular member interposed between them.

Provision is made for holding the two members in contact with the spherical or annular member, rollers being interposed between the driving means between the two bodies the power being transmitted from one body to the other through said rollers which, moreover, are so mounted or supported that their axes will always remain in the same plane irrespective of the inclination of the shafts or other bodies.

Projections upon the outside of the discs aforesaid are provided for the connection of the shafts or the like.

In order that the invention may be the better understood drawings are appended illustrating some forms of joints or couplings according to this invention, in which:—

Figure 1:
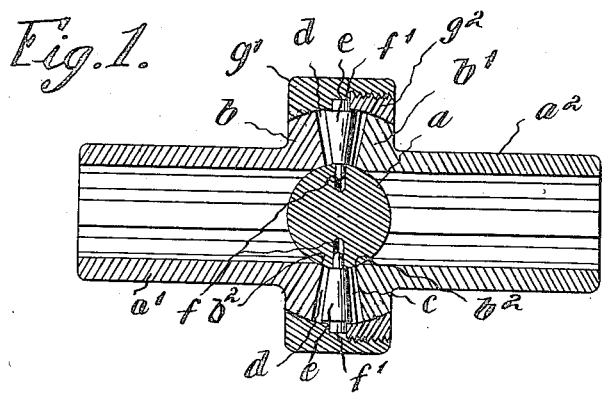
Figure 2:
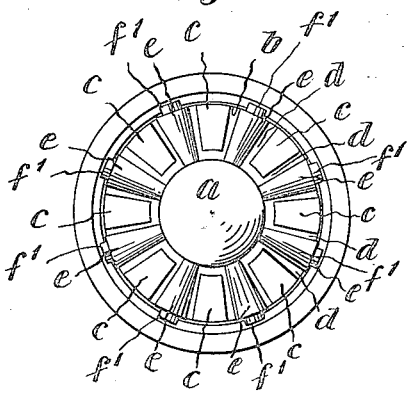
Figure 3:
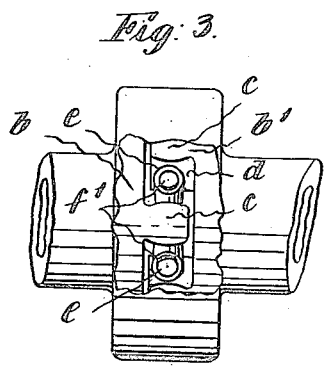
Figure 4:
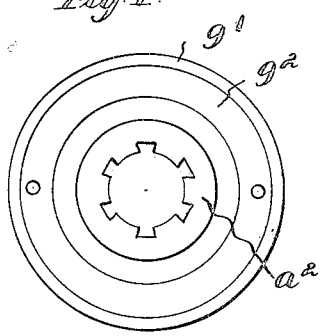
Figure 5:
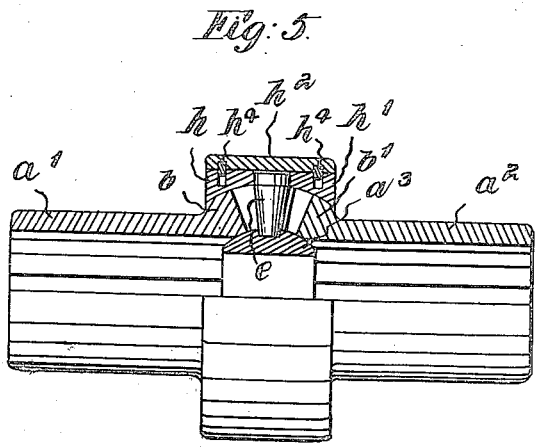
Figure 6:
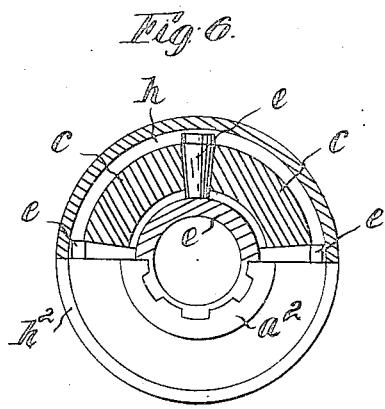

Fig. 1 is a longitudinal section of a form of joint or coupling,

Fig. 2 is an end elevation, with one side removed, of the coupling shown in Fig. 1, Fig. 3 is a side view partly broken away to show the ends of the rollers, Fig. 4 is an end view, Fig. 5 is a part longitudinal section showing a modified form of the invention, Fig. 6 is an end view partly in section of the coupling shown in Fig. 5, Referring to Figs. 1 to 4 of the drawings $a$ indicates a ball or sphere disposed one on each side of which are discs $b$, $b^1$ centrally cupped at $b^2$, $b^2$ to engage the sphere $a$ upon which the said discs are free to move in all directions.

Projecting from the inner face of each of the discs $b$, $b^1$ are radially disposed lugs or projections $c$ arranged at equi-distant intervals apart and having their faces rounded or curved as shown more clearly in Fig. 3 and so spaced that when assembled there are provided a series of recesses or openings $d$ each designed to contain a roller $e$ with which rollers are alternately engaged the rounded faces of the projections $c$, on the discs $b$, $b^1$. The rollers $e$ are held in position by short extensions or shafts $f$, $f^1$ provided respectively at their inner and outer ends and which engage suitable perforations in the sphere $a$ and an annular recess or opening between the inner face of the recessed portion $g$ of an outer annular member $g^1$ and ring $g^2$ screwed therein. The edges of the discs $b$, $b^1$ are curved as shown, the centre of the curve being upon the centre of the sphere $a$, the surfaces of the parts $g$, $g^1$ being correspondingly curved to permit the necessary angular movement of the said discs $b$, $b^1$. Extensions $a^1$, $a^2$ are provided upon discs $b$, $b^1$ for the connection of the ends of the shafte or other bodies. It will thus be seen that the axis of the rollers will always remain in one plane irrespective of the inclination of the shafts.

By this means it is possible to overcome or reduce the variation in the speed of the driving and driven shafts or other elements such as results from the use of couplings as at present in use, and with which it is customary, in order to counter-act this disadvantage, to employ a universal coupling at each end of the shaft, the action of the second coupling being to correct the increase and decrease of the speed of the first driven shaft before transmitting it to the final shaft. Moreover, by providing the projections $c$ with rounded surfaces the rollers $e$ may fit snugly between the said projections and any play between the parts, which would be necessary should the projections have flat surfaces, is avoided whereby a silent drive is obtained.

In the modified form of construction shown in Figs. 5 and 6 instead of a sphere an annular body $a^3$ is employed having a suitably curved outer surface designed to seat upon suitably curved surfaces formed upon the discs $b$, $b^1$ which discs are held together by means of annular bodies $h$, $h^1$ secured together by means of an exterior annular body $h^2$, both the annular bodies $h$, $h^1$ and body $h^2$ being provided with recesses $h^3$ into which are sprung locking rings $h^4$.

The general construction and arrangement of the coupling may be varied as may be found in practice to be necessary or desirable.

Claims.

1. In combination, a pair of members each provided with lugs alternating with the lugs of the other member; elongated rollers between the lugs, each having a length approximately twice its diameter; and positioning means for holding the rollers radial to a common center and in the same plane with each other; said means including a ring engaging the outer ends of the rollers.

2. In combination, a pair of members each provided with radial lugs alternating with the lugs of the other member; elongated rollers between the lugs each having a length approximately twice its diameter; a body engaging the inner ends of the roller; and a ring around said lugs and engaging the outer ends of the rollers and cooperating with said body to hold the rollers radial to said body and in the same plane with each other.

3. In combination, a pair of members each provided with radial lugs alternating with the lugs of the other member; rollers between the lugs and provided with outer extensions; a body engaging the inner ends of said lugs; and a ring around said lugs provided with an annular recess receiving said outer extensions and cooperating with said body whereby the rollers are supported so that their axes will remain radial to said body and in the same plane with each other.

4. In combination, a pair of members each provided with radial lugs alternating with the lugs of the other member; a body having an equatorial series of radial perforations; rollers between the lugs and provided with inner extensions received in said perforations; and a ring engaging the outer ends of the rollers to hold them in the perforations.

5. In combination, a pair of disks each provided with radial lugs alternating with the lugs of the other disk; a body having a series of perforations; rollers between the lugs and provided with outer and inner extensions, the latter being received in said perforations; and a ring around said lugs and provided with a recess receiving said outer extensions.

6. In combination, a pair of disks each provided with radial lugs alternating with the lugs of the other disk, the inner face of the two disks being curved; a body free of diametric bores and having curved surfaces engaging said curved inner faces; and rollers each having a length approximately twice its diameter disposed between the lugs and radially mounted on said body and supported so that their axes will remain in the same plane with each other and radial to the body.

7. In combination, a pair of disks each provided with radial lugs alternating with the lugs of the other disk, the inner faces of the two disks being also curved; a body having curved surfaces engaging said curved inner faces; and rollers free of axial bores and each having a length approximating twice its diameter disposed between the lugs and radially mounted on said body and supported so that their axes will remain in the same plane with each other.

8. In combination, a pair of members each provided with radial lugs alternating with the lugs of the other disk and having curved peripheral faces; rollers between the lugs and provided with outer extensions; a ring around said lugs provided with an annular recess receiving said outer extensions and forming spaced curved surfaces engaging said peripheral faces of both sets of lugs; and means cooperating with said ring to support the rollers so that their axes will remain in the same plane with each other.

9. In combination, a pair of members each provided with radial lugs alternating with the lugs of the other disk and having curved peripheral faces, rollers each having a length approximately twice its diameter disposed between the lugs; a body supporting the inner ends of said rollers; and a ring around said lugs forming spaced curved surfaces engaging said peripheral faces of both sets of lugs and cooperating with said body to hold the rollers so that their axes will remain in the same plane with each other and radial to said body.

10. In combination, a pair of members each provided with radial lugs alternating with the lugs of the other member; elongated rollers between the lugs; a body engaging the inner ends of the rollers; and a ring around said lugs and provided with an annular recess receiving the outer ends of the rollers and cooperating with said body to hold the rollers radial to said body and in the same plane with each other; said ring comprising a pair of annular members one screwed within the other and respectively forming the side walls of said annular recess.

11. A universal joint or coupling two discs having their outer edges curved to arcs of circles, an annular body surrounding said discs and having its inner periphery curved to engage the curved surface of one of the discs, a recess in said annular body, a second annular body retained in said recess and having its inner periphery curved to engage the curved surface upon the second disc, radially disposed tapering lugs projecting from the faces of said discs said lugs having their opposite faces of curved outline, curved surfaces upon the inner faces of the two discs, a body having a curved surface engaging said curved surfaces of said discs, conical rollers interposed between the curved faces of the lugs upon the discs, means for retaining the discs in engagement with the intermediate body and means engaging the ends of the rollers whereby they are supported so that their axis will remain in the same plane irrespective of the inclination of the bodies connected to the two first members.

12. A universal joint or coupling comprising two discs having their outer edges curved to arcs of circles, an annular body surrounding said discs and having its inner periphery curved to engage the curved surface of one of the discs, a recess in said annular body, a second annular body retained in said recess and having its inner periphery curved to engage the curved surface upon the second disc, radially disposed tapering lugs projecting from the faces of said discs said lugs having their opposite faces of curved outline, curved surfaces upon the inner faces of the two discs, a body having a curved surface engaging said curved surfaces of said discs, conical rollers interposed between the curved faces of the lugs upon the discs, means for retaining the discs in engagement with the intermediate body, projections upon the ends of the rollers said projections respectively engaging a channel formed between the adjacent faces of the outer annular body and the second annular body contained therein.

13. A universal joint or coupling comprising two discs having their outer edges curved to arcs of circles, an annular body surrounding said discs, other annular bodies contained within said first annular body and having their inner peripheries curved to engage the curved outer peripheries of the discs, recesses in the meeting surfaces of the inner and outer annular bodies, a split ring engaging said recesses thereby to hold them against lateral displacement, and in spaced relationship, radially disposed tapering lugs projecting from the faces of the discs, said lugs having their opposite faces of curved outline, curved surfaces upon the inner faces of the two discs, a body having a curved surface engaging the curved surfaces of the discs, conical rollers interposed between the curved surfaces of the lugs upon the discs, projections upon the outer ends of the rollers engaging the space between the inner annular bodies of the outer annular body, projections at the inner ends of the rollers engaging holes formed upon the body interposed between the two discs.

In testimony whereof I have hereunto set my hand in the presence of two witnesses.

HERBERT HART-SPRATT.

Witnesses:
C. SOMERS,
JOHN ROSSWICK.